J. H. BELSER.
SHAFT-COUPLING.
No. 186,527.   Patented Jan. 23, 1877.
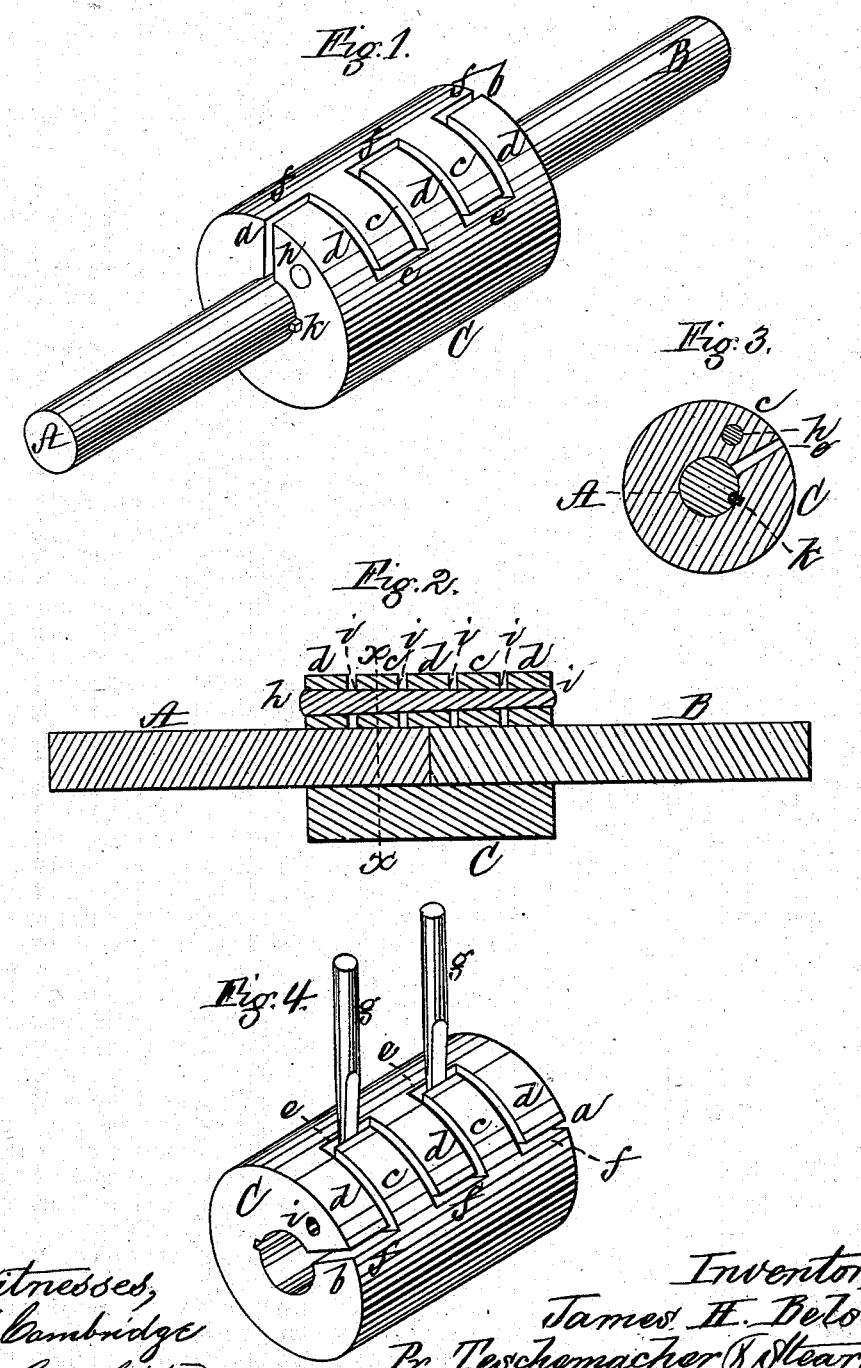

UNITED STATES PATENT OFFICE.

JAMES H. BELSER, OF MARLBOROUGH, MASSACHUSETTS.

IMPROVEMENT IN SHAFT-COUPLINGS.

Specification forming part of Letters Patent No. 186,527, dated January 23, 1877; application filed December 23, 1876.

*To all whom it may concern:*

Be it known that I, JAMES H. BELSER, of Marlborough, in the county of Middlesex and State of Massachusetts, have invented certain Improvements in Shaft-Couplings, of which the following is a full, clear, and exact description, reference being had to the accompanying drawings, making part of this specification, in which—

Figure 1 is a perspective view, representing two sections of shafting united by my improved coupling. Fig. 2 is a longitudinal vertical section through the center of the same. Fig. 3 is a transverse vertical section through the same on the line $x\,x$ of Fig. 2. Fig. 4 is a perspective view of the coupling, illustrating the method of expanding it to enlarge the central aperture for the admission of the ends of the shafts.

The object of my invention is to simplify the construction of shaft-couplings, thereby reducing their cost, and at the same time to greatly facilitate the operation of connecting or disconnecting a line of shafting; and my invention consists in a split sleeve provided with tongues or projections fitting into corresponding recesses or notches opposite thereto, by which construction the sleeve is caused to entirely encircle the shaft and clasp it tightly around its entire circumference, the sleeve being bored out when slightly expanded, so as to spring tightly around the shaft when applied thereto, a pin or bolt passing longitudinally through the sleeve or other suitable device being employed, if desired, in connection with the split sleeve to confine it in place upon the shaft with additional security.

To enable others skilled in the art to understand and use my invention, I will proceed to describe the manner in which I have carried it out.

In the said drawings, A B represent two sections or pieces of a line of shafting, the adjacent ends of which are united by a coupling consisting of a metal sleeve, C, cast in the form shown. This sleeve is split or divided lengthwise, so as to allow of its lateral expansion to admit the ends of the shafts and subsequent contraction thereon, the line of division $a\,b$ being composed of lines at right angles to each other, a series of tongues or projections, $c\,d$, being thus formed on opposite sides of the division-line, which fit into corresponding recesses or notches $e\,f$ opposite thereto, by which construction the sleeve, notwithstanding its split or division, is caused to entirely encircle and firmly gripe the shaft around its entire circumference, as required. After the sleeve C is cast it is slightly expanded or sprung apart by means of wedges $g$, Fig. 4, driven in between the tongues and the ends of their recesses. The interior or central aperture is then reamed or bored out so as to correspond exactly to the diameter of the shafting to which the sleeve is applied, so that when it has been slipped over the sections of shafting and the wedges $g$ removed, the spring or contraction of the metal will cause the sleeve to tightly clasp itself around the ends of these sections, and hold them firmly together, as required. $h$ is a pin or bolt, made tapering and passing longitudinally through a series of apertures, $i$, in the tongues $c\,d$, by which means the latter are locked together, and the sleeve is thus prevented from expanding, and is consequently confined in place upon the ends of the sections A B of the shafting, with additional security. The holes in the tongues are bored so as to be exactly in line when the sleeve is detached, so that when the sleeve is sprung apart slightly, as is the case when it is upon the shafting, the driving in of the pin $h$ will cause the sleeve to be still further contracted and tightened upon the shafting, as desired.

Instead of the pin $h$, screws may be employed extending from the body of the sleeve into the ends of the tongues $c\,d$; but this would necessitate the formation of recesses or countersinks to receive the heads of the screws, as it would be unsafe to allow them to project, on account of their liability to catch any object, such as clothing, with which they might come into contact.

For heavy shafting a key, $k$, is employed to prevent any possibility of the shaft turning within the sleeve; but for light shafting the key is not required, as the sleeve will gripe the shaft with sufficient friction to prevent it from turning independently thereof.

The above-described shaft-coupling is simple and inexpensive, and its exterior is smooth, without any flanges, lugs, or projecting bolts to catch the clothing or other objects, and consequently no covering-shell is required, as is the case in that class of shaft-couplings having split sleeves, as heretofore constructed. Furthermore, where my improved coupling is employed the operation of connecting or disconnecting a line of shafting is greatly facilitated, for the reason that as soon as the sleeve is loosened, by driving in the wedges $g$, it can be slid longitudinally on the shafting past the joint, after which the length or section of shafting to be put up or removed can be easily lifted into or out of its bearings without disturbing the remaining sections in the line.

What I claim as my invention, and desire to secure by Letters Patent, is—

1. A shaft-coupling consisting of a split metal sleeve, C, provided with tongues or projections $c\,d$, fitting into recesses or notches $e\,f$, so as to encircle the entire circumference of the shaft to which it is applied, substantially as and for the purpose set forth.

2. In combination with the split sleeve C, with its tongues and recesses, a pin or bolt, $h$, or other suitable device for clamping or confining the sleeve in place upon the shafting, substantially as described.

Witness my hand this 12th day of December, A. D. 1876.

JAMES H. BELSER.

In presence of—
   E. C. WHITNEY,
   E. R. ALLEY.